Patented Apr. 21, 1942

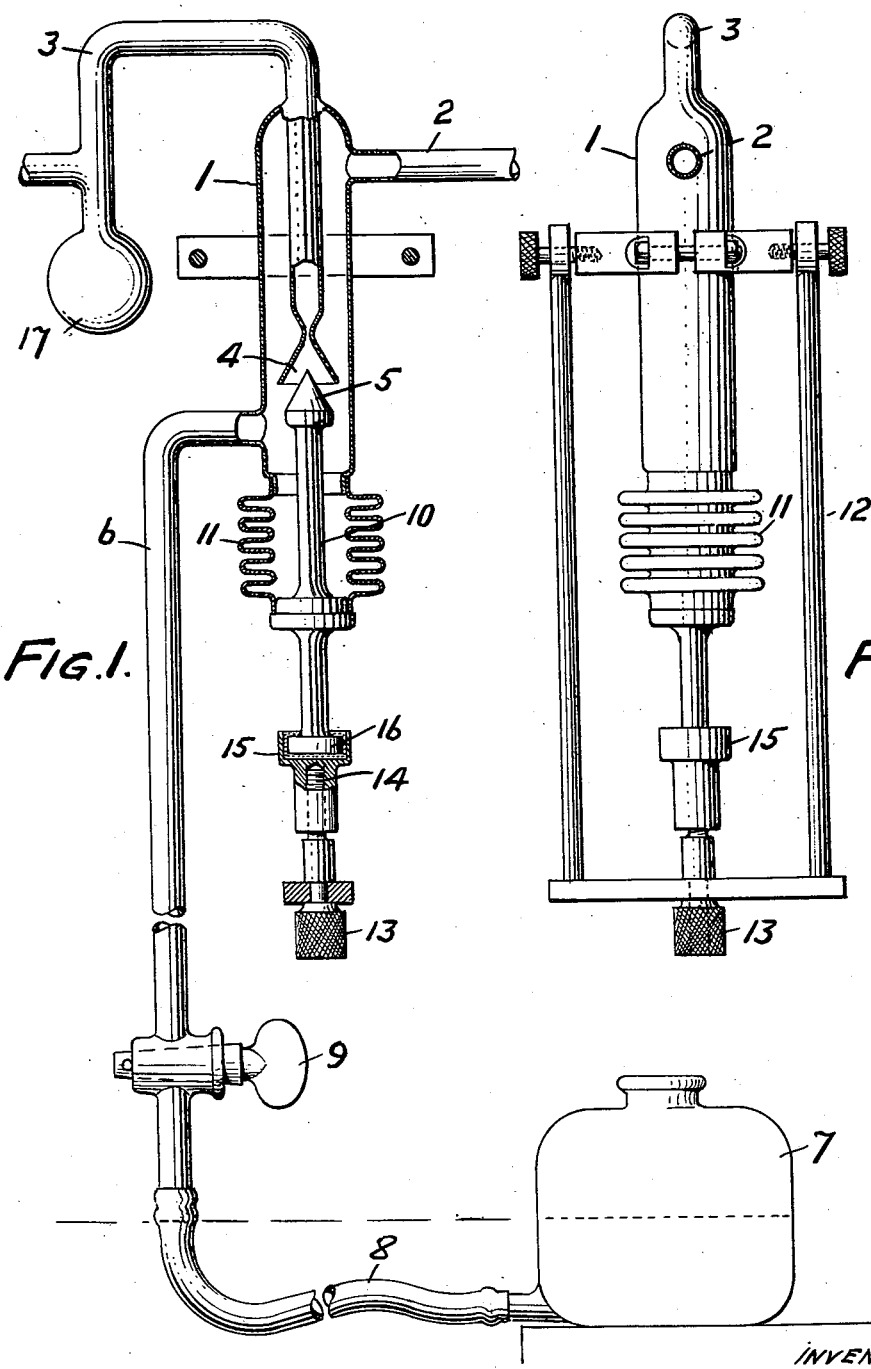

2,280,499

UNITED STATES PATENT OFFICE 2,280,499

VALVE

Holloway Wardlow Perkins, Beaumont, Tex., assignor to Sun Oil Company, Philadelphia, Pa., a corporation of New Jersey Application May 25, 1940, Serial No. 337,160

6 Claims. (Cl. 251—21)

This invention relates to valves for controlling the flow of fluid gases and the like, and more particularly to valves used under laboratory conditions requiring exacting operation.

An important object of the invention is to provide a valve which requires no lubricant, such as the usual glass stopcock requires, thereby insuring no pollution of the fluids passing through the valve otherwise caused by contact with stopcock grease, graphite or the like.

Another object is to provide a valve which will maintain a vacuum on the low pressure side of the apparatus with which it is used when a pressure as great or greater than atmospheric pressure is maintained on the other side, when gases are the fluid controlled.

A further object of the invention is accurately to control the flow of fluids from the high pressure side of an apparatus to the low pressure side.

A still further object is to provide a valve capable of being sealed around the seat by a fluid medium which may be placed or removed about the seat quickly and easily.

Other objects and advantages will be apparent during the course of the following description:

In the accompanying drawing, forming a part of this specification, and in which like numerals are employed to designate like parts throughout the same, Figure 1 is a side elevation, partly in cross-section of a valve embodying my invention, and, Figure 2 is a front elevation showing an assembled valve.

The apparatus, according to the invention, comprises an upper chamber 1 with intake 2 and outlet 3 through which the fluid to be controlled enters and leaves the valve assembly. Before passing to the outlet the gas passes down the upper chamber 1 and through opening 4, the aperture of which is controlled by stopper 5, the contacting portions of 4 and 5 being carefully machined or ground to provide as good a mechanical fit as possible.

When the valve is closed stopper 5 is firmly seated in opening 4, a sealing fluid, such as mercury or other liquid having a density heavy enough to form a seal against the controlled medium, and chemically inactive when in contact therewith, is then admitted through pipe 6, reaching a level high enough to seal the ground seat of the valve. The sealing fluid is caused to flow around the valve seat by lifting container 7, attached by flexible hose 8 to pipe 6, to a level higher than the valve seat. It is held in position around the seat, thereby sealing it, by any convenient means such as stopcock 9. To release the sealing fluid from the sealed position around the valve seat, container 7 is placed at a level below the body of the valve and stopcock 9 is opened, thereby permitting the sealing fluid to flow back to its container through inlet-outlet pipe 6 which enters upper chamber 1 at an elevation below the closed valve seat.

Stopper 5 is movably supported by a metallic or other tubular bellows, or diaphragm 11, which will not chemically affect the composition of the fluid passing through the valve, which in turn is fastened by any convenient sealing means to the lowest part of chamber 1. The valve stem 10 is likewise fastened to the lower end of bellows 11.

To adjust the valve opening and thereby regulate the flow of fluid through the valve, a removable yoke 12 is clamped to upper chamber 1, in such manner that it remains in fixed position while knurled head 13 on adjusting screw 14 transmits pressure to cup-bearing 15, thence to the shoulder 16 on valve stem 10. By applying pressure against the fixed yoke support 12, bellows 11 is compressed placing stopper 5 in proper relation to opening 4, adjusting the fluid flow therethrough. Releasing the pressure by dropping bearing-cup 15 by release of screw 14 will cause bellows 11 to expand and withdraw stopper 5 from the closed relation with opening 4.

In operation, bellows 11 will be filled with sealing fluid, preferably mercury, as will the lower part of upper chamber 1 below the level of pipe 6. It is therefore possible that some mercury, or any other sealing fluid, will be carried up through outlet 3. In order to prevent the sealing fluid from being carried to other parts of the apparatus, with which the present valve is used, trap 17 is placed in outlet line 3.

While it is preferred that the present valve be made of glass, I do not limit this invention to its manufacture in that material only. It is to be understood that the form of my invention, herewith shown and described, is to be taken as a preferred example of the same, and that various changes in the shape, size and arrangement of parts may be resorted to, without departing from the spirit of the invention, or the scope of the subjoined claims.

What I claim and desire to protect by Letters Patent is:

1. A valve comprising a chamber, an inlet thereto, an outlet therefrom below said inlet, valve members within said chamber controlling exit of fluid therefrom, expansible means supporting one of said valve members and adapted to be filled with sealing fluid, means outside said chamber adapted to operate said expansible means and open and close said valve, and means below said outlet for admitting a sealing fluid to said chamber and permitting its exit therefrom to effectively seal said valve member when in contact.

2. A needle valve comprising a valve body, fluid inlet and outlet ports in said valve body, a frustro-conical valve seat in said valve body between said inlet and outlet ports, a conical faced valve closure member wholly within said valve body adapted to seat against said valve seat and close the valve, means outside said valve body for operating said closure member, fluid inlet means for admitting a realing liquid into said valve body and about said valve seat to thereby seal said valve, and means for controlling the level of said sealing liquid about said valve seat.

3. A valve for controlling the flow of fluids comprising a chamber, a fluid inlet thereto, a fluid outlet therefrom, a bellows having a closed lower end and constituting a lower extension of said chamber, a valve seat at said outlet, a valve adapted to engage said seat and having a stem extending through said bellows and fastened to the closed lower end thereof, means outside the chamber to compress said bellows and thereby move said valve into and out of engagement with said seat, a sealing fluid inlet below said valve seat, and means adapted to admit sealing fluid therethrough to said chamber to a level above said valve seat when said valve is closed to thereby seal the same, and to allow the escape of sealing fluid therethrough from said chamber to thereby drop the level of said sealing fluid below said valve seat when the valve is open.

4. A valve for controlling the flow of fluids comprising a chamber, a fluid inlet thereto, a fluid outlet therefrom, a bellows constituting a lower extension of said chamber, a valve seat at said outlet, a valve adapted to engage said seat and having a stem extending through said bellows and a flange on the stem closing the lower end of the valve chamber below said bellows, means outside the chamber to move the valve into and out of engagement with said seat, a sealing fluid inlet below said valve through which sealing fluid is admitted to fill said bellows and maintain a normal sealing fluid level in the chamber below said valve seat when the valve is open, and means adapted to admit additional sealing fluid to said chamber to raise the level of the sealing fluid therein to above said valve seat and thereby seal the valve when closed, and to allow the escape of sealing fluid to its normal level when the valve is open.

5. A valve closure comprising a valve seat and a valve movable into closed relation with the valve seat, a compressible chamber communicating with said valve seat and on which said valve is mounted so as to be moved into closed relation with the valve seat when said chamber is compressed, and a source of supply of sealing liquid from which sealing liquid may be admitted to said compressible chamber to fill the same and immerse and seal the closed valve.

6. A valve for controlling flow of fluids comprising a chamber, an inlet thereto, an outlet therefrom below said inlet, valve members within said chamber controlling exit of fluid from said chamber through said outlet, a contractible and expansible chamber communicating with the first named chamber and adapted to support one of said valve members, means outside said chambers to contract and expand said contractible and expansible chamber and thereby move the valve member supported thereby into and out of closed relation with the other valve member, and means to admit a sealing fluid to said contractible and expansible chamber whereby the last named chamber may be contacted to simultaneously move said valve members into closed relation and bring said sealing liquid into sealing relation with said closed valve members.

HOLLOWAY WARDLOW PERKINS.